United States Patent
Waters

(10) Patent No.: US 11,375,024 B1
(45) Date of Patent: Jun. 28, 2022

(54) PROGRAMMABLE NETWORKING DEVICE FOR USER PLANE FUNCTION

(71) Applicant: T-MOBILE INNOVATIONS LLC, Overland Park, KS (US)

(72) Inventor: Brian Waters, Angel Fire, NM (US)

(73) Assignee: T-Mobile Innovations LLC, Overland Park, KS (US)

( * ) Notice: Subject to any disclaimer, the term of this patent is extended or adjusted under 35 U.S.C. 154(b) by 0 days.

(21) Appl. No.: 17/181,615

(22) Filed: Feb. 22, 2021

(51) Int. Cl.
  *G06F 15/173* (2006.01)
  *H04L 67/14* (2022.01)
  *H04L 47/20* (2022.01)
  *H04L 47/215* (2022.01)

(52) U.S. Cl.
  CPC .............. *H04L 67/14* (2013.01); *H04L 47/20* (2013.01); *H04L 47/215* (2013.01)

(58) Field of Classification Search
  CPC ........ H04L 67/14; H04L 47/20; H04L 47/215
  See application file for complete search history.

(56) References Cited

U.S. PATENT DOCUMENTS

| | | | |
|---|---|---|---|
| 8,165,152 B2 | 4/2012 | Sammour et al. | |
| 8,223,758 B2 | 7/2012 | Eriksson | |
| 8,837,285 B2 | 9/2014 | Sammour et al. | |
| 2017/0289046 A1* | 10/2017 | Faccin | H04L 47/20 |
| 2017/0324652 A1* | 11/2017 | Lee | H04L 43/16 |
| 2019/0335002 A1* | 10/2019 | Bogineni | H04W 48/16 |
| 2020/0059992 A1* | 2/2020 | Skog | H04L 67/14 |
| 2020/0267085 A1* | 8/2020 | Nie | H04L 47/2483 |

FOREIGN PATENT DOCUMENTS

WO  2019/238252 A1  12/2019

* cited by examiner

*Primary Examiner* — Cheikh T Ndiaye

(57) ABSTRACT

Programmable network devices configured to perform various UPF functions including QoS enforcement, session management, and timer synchronization. Field-programmable gate arrays (FPGAs) are configured to perform user plane functions on data streams within a compact and modular hardware unit to minimize excessive communication while maintaining control and user plane separation (CUPS). QoS enforcement can include guaranteed bit rate (GBR) and maximum bit rate (MBR) and token buckets associated therewith, pipeline processing, synchronizing transmission of data packets and control signals with timers at various operational levels, and so on.

20 Claims, 9 Drawing Sheets

PROGRAMMABLE NETWORKING DEVICE FOR USER PLANE FUNCTION

TECHNICAL BACKGROUND

As communication networks evolve and grow, there are ongoing challenges in communicating data across different types of networks. A communication network can include, for example, a combination of a wireless network and a packet data network such as the internet. Other types of communication networks in various combinations may be envisioned by those having ordinary skill in the art, such as wireline networks, local area networks (LANs), wide area networks (WANs), telephone networks, cellular networks, satellite networks, packet switched networks, and so on. Communicating data between these different types of networks requires specialized components, such as gateways, routers, switches, etc. For example, 4G networks utilize serving gateways (S-GW) and packet gateways (P-GW) located in the core network, and 5G networks utilize various servers collectively referred to as the session management function (SMF) and user plane function (UPF) to perform similar functions. Gateways and switches are useful for routing data packets from a source node to a destination node and traversing different networks, e.g. from an end-user wireless device attached to an access node, to a server on the internet, etc.

Further, there have been efforts to decouple session management from packet processing, such efforts being generally described as control and user plane separation (CUPS). While these CUPS efforts are useful, there still remain inefficiencies with transmitting data through existing gateways. For example, with increasing numbers of wireless devices and complexity of radio-access networks (RANs), there is more data being routed through core gateways or other servers prior to being routed. Thus, large amounts of data still have to traverse different network nodes in order to be properly routed to their destinations. Data in the order of billions of packets per second traverses modern networks, thus requiring robust packet processing mechanisms that cause excessive signaling between the control and user planes. For example, existing user plane functions (UPF in 5G, and user gateways in 4G) combine hardware components programmed strictly for packet processing (such as programmable network switches and devices) having very little processing dedicated towards "management" functions, and external servers or hosts for instructing the network switches how to process the data.

There are limitations with these implementations, specifically with regards to throughput limitations as to the amount of data that can be processed. This is partly due to the extra communication that is required between the switching hardware components and the external hosts/servers. For example, billions of packets per second involve many more quality of service (QoS) rules, forwarding rules, as well as generating reports and instructions for smooth pipeline processing. The capacity limitations of existing user plane functions results in lower-than-optimal throughput, which is undesirable for operators of modern communication networks.

OVERVIEW

Exemplary embodiments described herein include programmable network devices that are configured to perform various functions including applying quality of service (QoS) to data packets and data sessions, session management, data processing, pre-processing, post-processing, pipeline processing, and data transport and switching functions. Further described herein are systems including such programmable network devices, and methods executed by various components in such systems.

An exemplary method described herein includes configuring a field-programmable gate array (FPGA) to perform a plurality of user plane functions, the plurality of user plane functions comprising at least applying a quality of service (QoS) policy to data sessions routed through the FPGA, and routing data packets associated with the data sessions through the FPGA.

An exemplary FPGA described herein comprises a processor and a memory coupled to the processor, the memory being programmed with instructions that are executed by the processor to perform operations including receiving a data packet at the FPGA, applying a quality of service (QoS) policy to the data packet, and forwarding the data packet based on the QoS policy.

DETAILED DESCRIPTION

Figure 1:
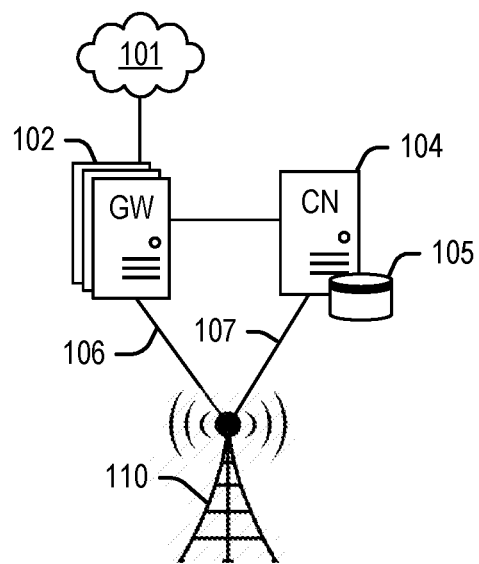
FIG. 1 depicts an exemplary system.
Figure 1:
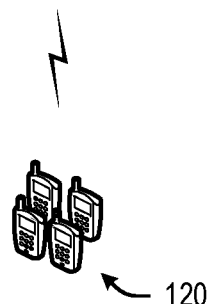

Embodiments disclosed herein provide programmable network devices that are configured to perform user plane functions on data streams within a compact and modular hardware unit to minimize excessive communication while maintaining control and user plane separation (CUPS). The programmable network device can include one or more processors, memories, and one or more embedded hardware chips, such as a field programmable gate array (FPGA), an application-specific integrated circuit (ASIC), or similar. In exemplary embodiments described herein, a host module on a memory coupled to a processor can interface between an FPGA programmed with UPF functionality and a control plane network node or gateway. The user plane functions performed by such a device can include applying quality of service (QoS) policies to data packets traversing the user plane, managing data sessions associated with different rules such as guaranteed bit rate (GBR) and maximum bit rate (MBR) and token buckets associated therewith, pipeline processing, synchronizing transmission of data packets and control signals with timers at various operational levels, and so on.

Such programmable network devices can enhance or replace the myriad existing packet gateways, such as a CUPS based user plane S-GW, P-GW, or SAE-GW in 4G networks, and user plane functions (UPF) in 5G networks. This eliminates the need for an external host server, as well minimizing excessive communication and signaling that is required to communicate between the separate prior-art switches and external host servers. Whereas in the prior art, an external host server communicates with an embedded device (such as a switch) and instructs the device with regards to QoS, session management, etc., providing a programmable network device with host, session management, and pipeline processing functions that interface with each other and perform data processing within a single unit preserves network resources such as power, bandwidth, etc. Hereinafter for the purposes of this disclosure, the terms "host", "host server", and "server" are considered as interchangeable.

Exemplary programmable network devices described herein may be positioned or located at various points within a network topology depending on a network operator's requirement. In an exemplary embodiment, a programmable network device as described herein can be co-located with an access node, such as a gNodeB or eNodeB, such that data flows may directly egress from the user plane at the radio access network (RAN) to the destination network. For example, the programmable network device can replace a user plane or data plane elements of a system architecture evolution (SAE) gateway in 4G networks, or can replace an intermediate UPF (iUPF) in 5G networks. This eliminates having to transport the data packets to central sites or networks. In further embodiments described herein, several programmable network devices can be arranged such that data packets originating from various RANs can traverse minimal other networks or nodes to reach their destination. Incorporating data management functions into these programmable network devices also minimizes the need for extra control plane elements and communication therebetween.

FIG. 1 depicts an exemplary system 100, including a communication network 101, gateway node(s) 102, controller node 104, access node 110, and wireless devices 120. Access node 110, along with other components (not illustrated herein), can be part of a radio access network (RAN) of a wireless network, and controller node 104 can be part of a core network of the wireless network. The one or more gateway node(s) 102 can include a 4G CUPS gateway, 5G UPF, or any other type of gateway. Further, the one or more gateway node(s) 102 can be distributed in various portions of the wireless network, such as coupled to access node 110 in the RAN, located within the core network, etc. In an exemplary embodiment, the one or more gateway node(s) 102 include a programmable network device as further described herein. Further, it is noted that while access node 110, wireless devices 120, gateway node(s) 102, and controller node 104 are illustrated in FIG. 1, any number of identical or additional network nodes and devices can be implemented. For example, FIGS. 4-6 respectively illustrate components of exemplary 4G and 5G networks.

Further, and as described in detail herein, one or more programmable network devices may be incorporated within system 100. For example, the one or more programmable network devices may be included within one or more gateway node(s) 102, at any logical or physical location within system 100. In an exemplary embodiment, a programmable network device incorporates a host module configured to manage data sessions and life cycles associated with data packets transmitted between wireless devices 120 and communication network 101. The programmable network device can further include one or more FPGAs configured to perform user plane functions, including but not limited to pipeline processing, applying QoS policies, associating source nodes, destination nodes, bearers, tunnels (and so on) with the data packets, modifying headers of the data packets, encapsulation, decapsulation, routing table lookups, clock functions, timer synchronization, transport data packets associated with the data sessions to different network nodes, and other management and transport functions. Additionally, the FPGA can include extra memory that can be used for buffering packets, e.g. for QoS traffic shaping purposes, versus dropping packets if the current traffic policy indicates that a packet cannot be forwarded at a given time due to policy limits being reached. Further, the QoS tokens for maximum bit rate (MBR) and guaranteed bit rate (GBR) rules can be stored on the FPGA, and replenished as and when needed. Thus, incorporating the user plane functions and session management functions on the FPGA can result in more effective bandwidth utilization with fewer dropped packets, faster packet processing, and a more flexible QoS implementation.

In addition to the programmable network devices described herein, gateway node(s) 102 can include additional standalone computing device, computing systems, or network components, and can be accessible, for example, by a wired or wireless connection, or through an indirect connection such as through a computer network or communication network. For example, gateway node(s) 102 can additionally include a 4G CUPS gateway, such as any combination of a control-plane serving gateway (SGW-C), user-plane serving gateway (SGW-U), control-plane packet data network gateway (PGW-C), user-plane packet data network gateway (PGW-U), a 5G user plane function (UPF), etc. One of ordinary skill in the art would recognize that gateway node(s) 102 are not limited to any specific technology architecture, such as Long Term Evolution (LTE) or 5G NR, and can be used with any network architecture and/or protocol.

Gateway node(s) 102 can comprise a processor and associated circuitry to execute or direct the execution of computer-readable instructions to obtain information. Gateway node(s) 102 can retrieve and execute software from storage, which can include a disk drive, a flash drive, memory circuitry, or some other memory device, and which can be local or remotely accessible. The software comprises computer programs, firmware, or some other form of machine-readable instructions, and may include an operating system, utilities, drivers, network interfaces, applications, or some other type of software, including combinations thereof. Gateway node(s) 102 can receive instructions and other input at a user interface. Specific gateway node(s) 102 comprising processing nodes and programmable network devices are further described herein with reference to FIGS. 2-3.

Controller node 104 can be any network node configured to communicate information and/or control information over system 100. Controller node 104 can be a standalone computing device, computing system, or network component, and can be accessible, for example, by a wired or wireless connection, or through an indirect connection such as through a computer network or communication network. For example, controller node 104 can include a mobility management entity (MME), a session management function (SMF), an access and mobility function (AMF), a Home Subscriber Server (HSS), a Policy Control and Charging Rules Function (PCRF), an authentication, authorization, and accounting (AAA) node, a rights management server (RMS), a subscriber provisioning server (SPS), a policy server, etc. One of ordinary skill in the art would recognize that controller node 104 is not limited to any specific technology architecture, such as Long Term Evolution (LTE) or 5G NR, and can be used with any network architecture and/or protocol.

Controller node 104 can comprise a processor and associated circuitry to execute or direct the execution of computer-readable instructions to obtain information. Controller node 104 can retrieve and execute software from storage, which can include a disk drive, a flash drive, memory circuitry, or some other memory device, and which can be local or remotely accessible. In an exemplary embodiment, controller node 104 includes a database 105 for storing control information related to data sessions and data packets that traverse one or more gateway(s) 102. This information may be requested by or shared with gateway(s) 102, access node 110, and so on. The software comprises computer programs, firmware, or some other form of machine-readable instructions, and may include an operating system, utilities, drivers, network interfaces, applications, or some other type of software, and combinations thereof. Controller node 104 can receive instructions and other input at a user interface.

Communication network 101 can be a wired and/or wireless communication network, and can comprise processing nodes, routers, gateways, and physical and/or wireless data links for carrying data among various network elements, including combinations thereof, and can include a local area network a wide area network, and an internetwork (including the Internet). Communication network 101 can be capable of carrying data, for example, to support voice, push-to-talk, broadcast video, and data communications by wireless devices 120, etc. Wireless network protocols can comprise MBMS, code division multiple access (CDMA) 1×RTT, Global System for Mobile communications (GSM), Universal Mobile Telecommunications System (UMTS), High-Speed Packet Access (HSPA), Evolution Data Optimized (EV-DO), EV-DO rev. A, Third Generation Partnership Project Long Term Evolution (3GPP LTE), and Worldwide Interoperability for Microwave Access (WiMAX), Fourth Generation broadband cellular (4G, LTE Advanced, etc.), and Fifth Generation mobile networks or wireless systems (5G, 5G New Radio ("5G NR"), or 5G LTE). Wired network protocols that may be utilized by communication network 101 comprise Ethernet, Fast Ethernet, Gigabit Ethernet, Local Talk (such as Carrier Sense Multiple Access with Collision Avoidance), Token Ring, Fiber Distributed Data Interface (FDDI), and Asynchronous Transfer Mode (ATM). Communication network 101 can also comprise additional base stations, controller nodes, telephony switches, internet routers, network gateways, computer systems, communication links, or some other type of communication equipment, and combinations thereof. In an exemplary embodiment, communication network 101 includes a packet data network (PDN), such as the internet.

Communication links 106, 107 can use various communication media, such as air, space, metal, optical fiber, or some other signal propagation path—including combinations thereof. Communication links 106, 107 can be wired or wireless and use various communication protocols such as Internet, Internet protocol (IP), local-area network (LAN), optical networking, hybrid fiber coax (HFC), telephony, T1, or some other communication format—including combinations, improvements, or variations thereof. Wireless communication links can be a radio frequency, microwave, infrared, or other similar signal, and can use a suitable communication protocol, for example, Global System for Mobile telecommunications (GSM), Code Division Multiple Access (CDMA), Worldwide Interoperability for Microwave Access (WiMAX), Long Term Evolution (LTE), 5G NR, or combinations thereof. Communications links 106, 107 may include N1, N2, N3, N4, and N6 interfaces. Other protocols can also be used. Communication link 106 can be a direct link or might include various equipment, intermediate components, systems, and networks. Communication link 106 may comprise many different signals sharing the same link.

Access node 110 can be any network node configured to provide communication between wireless devices 120 and communication network 101, including standard access nodes and/or short range, low power, small access nodes. For instance, access node 110 may include any standard access node, such as a macrocell access node, base transceiver station, a radio base station, an eNodeB device, an enhanced eNodeB device, a next generation or gigabit NodeB device (gNBs) in 5G networks, or the like. In other embodiments, access node 110 can be a small access node including a microcell access node, a picocell access node, a femtocell access node, or the like such as a home NodeB or a home eNodeB device. By virtue of comprising a plurality of antennae as further described herein, access node 110 can deploy or implement different radio access technologies (RATs) such as 3G, 4G, 5G, sub-6G, mm-wave, as well as transmission modes including multiple-input-multiple-output (MIMO), single user MIMO (SU-MIMO), multi-user MIMO (MU-MIMO), etc.

Access node 110 can comprise a processor and associated circuitry to execute or direct the execution of computer-readable instructions to perform operations such as those further described herein. Briefly, access node 110 can retrieve and execute software from storage, which can include a disk drive, a flash drive, memory circuitry, or some other memory device, and which can be local or remotely accessible. The software comprises computer programs, firmware, or some other form of machine-readable instructions, and may include an operating system, utilities, drivers, network interfaces, applications, or some other type of software, including combinations thereof. Further, access node 110 can receive instructions and other input at a user interface. Access node 110 communicates with gateway node(s) 102 via communication link 106 and with controller node 104 via communication link 107. Access node 110 may communicate with other access nodes (not shown) using a direct link such as an X2 link or similar.

Wireless devices 120 may be any device, system, combination of devices, or other such communication platform capable of communicating wirelessly with access node 110 using one or more frequency bands deployed therefrom. Each of wireless devices 120 may be, for example, a mobile phone, a wireless phone, a wireless modem, a personal digital assistant (PDA), a voice over internet protocol (VoIP) phone, a voice over packet (VOP) phone, or a soft phone, as well as other types of devices or systems that can exchange audio or data via access node 110. Other types of communication platforms are possible.

Other network elements may be present in system 100 to facilitate communication but are omitted for clarity, such as base stations, base station controllers, mobile switching centers, dispatch application processors, and location registers such as a home location register or visitor location register. Furthermore, other network elements that are omitted for clarity may be present to facilitate communication, such as additional processing nodes, routers, gateways, and physical and/or wireless data links for carrying data among the various network elements, e.g. between access node 110 and communication network 101.

Figure 2:
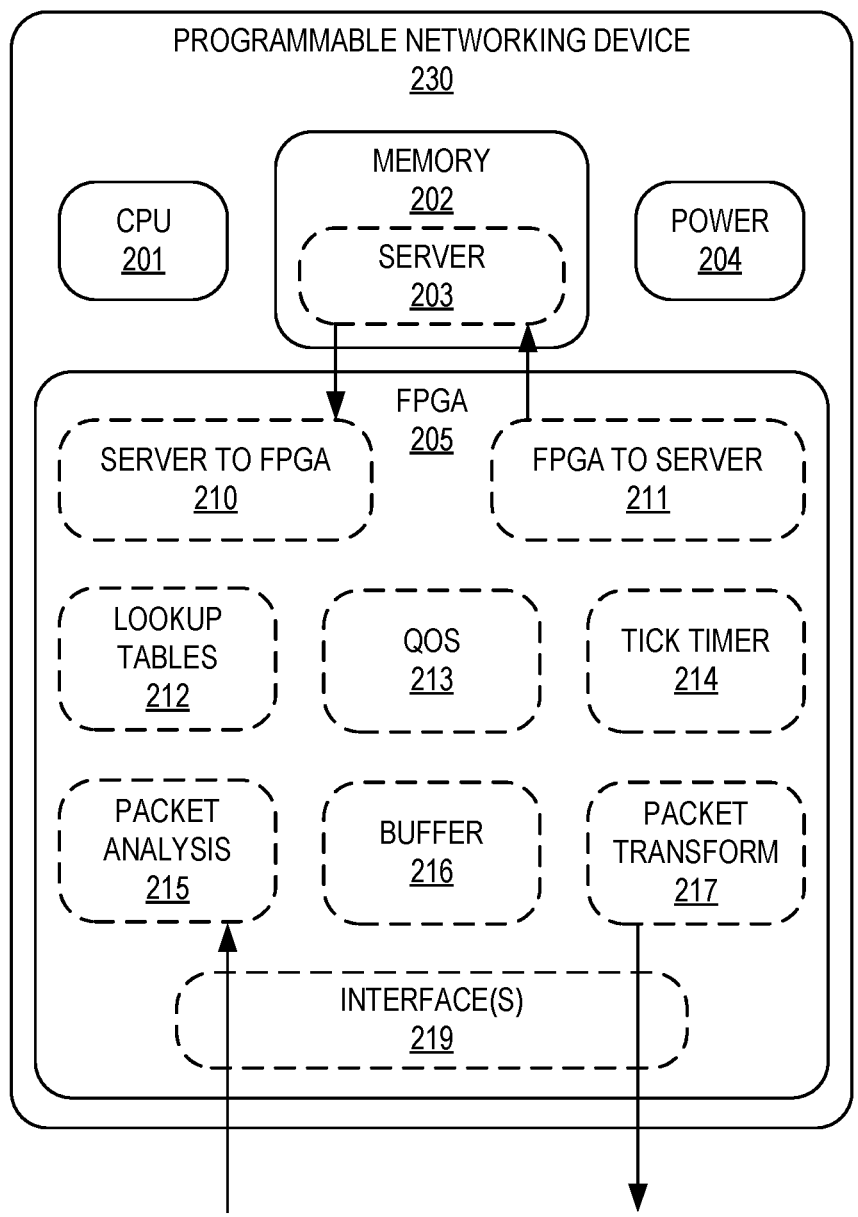
FIG. 2 depicts an exemplary programmable networking device configured to perform user plane functions.

FIG. 2 depicts an exemplary programmable network device 230. Programmable network device 230 includes at least a host module or server 203 stored on a memory 202, a processor 201, a power supply 204, and a FPGA 205. Server 203 is configured to manage data sessions and life cycles associated with data packets that are processed by FPGA 205, and to interface with a control plane network node or gateway. For example, server 203 can receive control-plane instructions from a session management function (SMF), a gateway control plane (SGW-C, PGW-C, or SAEGW-C), or a controller node. Further, server 203 can initiate processes or kernels on the FPGA 205, or interface with persistent kernels, and communicate information about data packets and sessions between the kernels on FPGA 205 and other network elements, such as on the control plane as described above. FPGA 205 can include one or more programmable logic gates and a memory for storing instructions enabling the use of single AND/OR functions to more complex functions that enable use of the FPGA as a comprehensive multi-core processor, such as kernels 210-217. Generally, FPGAs can be optimized for particular workloads, e.g. video and imaging, to circuitry for computer, auto, aerospace, and military applications, in addition to electronics for specialized processing and more. FPGAs are particularly useful for prototyping ASICs or processors, and combined with other circuits and/or processing systems or nodes, such as pipeline processing components further described herein. It is to be understood that FPGA 205 can further include components that are not shown herein, but understood as being necessary to execute the functions described below, such as a memory and a processor. The kernels described herein may be programmed using a high-level programming language, such as C++ or equivalent. An abstraction layer similar to one API may be used to build the kernels, enabling the kernels to operate persistently.

In this exemplary embodiment, FPGA 205 is programmed with functions in the form of kernels, including at least host to FPGA kernel 210, FPGA to host kernel 211, lookup tables 212, QoS kernel 213, tick timer kernel 214, packet analysis kernel 215, buffer 216, and packet transformation kernel 217. For the purposes of this disclosure, a kernel is equivalent to a piece of code that contains executable instructions for specific tasks, including user plane functions. Further, each kernel can communicate with other kernels, and transfer information to and from other kernels. For example, a packet analysis kernel 215 is configured to receive data packets within one or more data streams, and forward the data packets to other kernels, such as QoS kernel 213. Packet analysis kernel 215 may further refer to lookup tables 212 to determine how and where to forward the data packet. A buffer 216 is used to buffer data packets, and packet transformation kernel 217 may be configured to modify headers and forward data packets to other network nodes. For example, combination of QoS kernel 213 and packet transformation kernel 217 can refer to tick timer 214 to perform token-based forwarding of data packets, using for example GBR and MBR rules associated with the data packets or data streams.

In an exemplary embodiment, QoS kernel 213 uses tokens, wherein MBR/GBR policies are applied based on tokens in different buckets associated with different packet detection rules and/or QoS enforcement rules (QER). In an exemplary embodiment, tokens are added to buckets upon application of a rule (QER/PDR) rather than at periodic intervals or by any other default mechanism. Unlike the prior art wherein token buckets are refilled based on timers, the disclosed embodiment enables handling the high volume of data sessions (and multiple buckets and/or rules associated therewith) without causing delays or overwhelming networks. Multiple QERs may be applied to each single packet, and runtime data associated with the QER (e.g. usage tokens, etc.) can be processed only when a particular QoS rule is applied or enforced. This process also invokes the tick timer kernel 214, which indicates when tokens were added to buckets, and evaluates the application of the rules based thereon. Further, the time windows in tick timer kernel 214 for evaluating application of rules can include one or more sliding time windows, during which tokens are incremented in individual buckets. Rules and reports can be generated and transmitted to host 203 and/or other network entities in a synchronized manner without excessive resource usage. The tick timer kernel 214 includes a clock, which enables FPGA 205 to perform pipeline processing of data packets through each different kernel, without having to synchronize with external clocks. In an exemplary embodiment, a "tick" comprises a 5-millisecond time window.

The tick timer kernel 214 transmits tick information to QoS kernel 213, enabling QoS kernel to apply QoS rules based on QERs and PDRs. The QoS kernel 213 further receives session and bearer information (e.g. session ID) from packet analysis kernel 215 and/or lookup tables 212, based on which the relevant QERs and PDRs can be retrieved. In an exemplary embodiment, a PDR is obtained for a session associated with a data packet, and QERs (such as MBR and GBR rules, as well as other rules like forwarding action rule, usage reporting rules, etc.) are determined based on the PDR. As/when rules are applied, tokens are forwarded to packet transformation kernel 217, which performs packet header rewriting, enabling the packet to be forwarded to an appropriate destination. Packets can be buffered in buffer 216, for example as a first in first out (FIFO) linked list associated with a particular PDR. Further, packets can be forwarded from FPGA 205 based on a combination of factors including tokens in the bucket, timer ticks, packet size, other contents of buffer 216, and so on. For example, multiple packets associated with different PDRs may exceed an average maximum bit rate (AMBR) rule, which results in a session QER being exceeded, which in turn affects every additional packet in the buffer 216. Thus, transmission of packets may be synchronized at a future time. In an exemplary embodiment, a packet may be able to be transmitted after 3 tick timers. The session is then associated with a future tick, and the tick timer kernel 214 sends a message to the QoS kernel 213 indicating that the tick has occurred. The QoS kernel 213 processes this message by retrieving a list of ticks and evaluates the data session (and others) associated with that tick. Further in an exemplary embodiment, packets are forwarded based on a precedence value of one or more PDRs associated with the data packet (or data session). For example, while data packets associated with a specific PDR are transmitted based on FIFO, data packets associated with different PDRs can use a precedence value.

Further kernels on FPGA 205 can be configured to utilize timer pooling. In an exemplary embodiment, an end of a kernel-layer clock cycle (e.g. as measured by tick timer 214) is synchronized with an operation-system-layer clock cycle (e.g. as measured by host 203). In other words, each user plane function is synchronized with an end-time of a host-layer clock cycle, and each user plane function is executed (i.e. as a kernel 210-217) for the duration of one or more host-layer clock cycles. Further the host 203 may be configured to deploy a timer associated with each usage process, and upon expiration thereof, generates a time-based usage report to the control plane (e.g. SMF or other control gateway communicatively coupled thereto). Therefore, one host-layer timer object per expiration time is provided regardless of when the timer started, enabling multiple logical (i.e. kernel-layer) timer elements associated with the single expiration time. This also enables a single notification to be generated at the single expiration time. Due to packet processing a large number of packets within a session, millions of timers may be running at the kernel layer, and are pegged to one higher-layer timer object per expiration time. The expiration times can also be normalized, e.g. arranged in 50 ms increments, such that a timer is started as being associated with a specific expiration time, and the event notification for the timer is created upon that specific expiration time being met. Kernel-layer timers that are canceled can be removed or disassociated itself from the specific expiration time. This minimizes a total number of timers and number of usage reports for the packet processing pipeline.

Further, programmable network device 230 can includes one or more ports (not shown herein) that are associated with different reference points, or configured to communicate with different network nodes such as access nodes or wireless devices (on the RAN), one or more gateways or functions on the core network, or any other network node on the PDN, including but not limited to application servers, session management, proxy, web server, media server, or end-user wireless devices coupled to another wireless network or RAN. For example, a programmable network device can include a first set of ports associated with reference points for data transmission between different network nodes, and a second set of ports associated with reference points for control signal transmission between different network nodes. In an exemplary embodiment, a programmable network device includes at least a port associated with the N3 reference point, which is used as a data input or output between the programmable network device and a radio access network or access node within the radio access network. In an exemplary embodiment, a programmable network device includes at least a port associated with the N6 reference point, which is used as a data input or output between the programmable network device and a packet data network (PDN). In an exemplary embodiment, a programmable network device includes at least a port associated with the N9 reference point, which is used as a data input or output between the programmable network device and another programmable network device, such as an intermediate UPF (iUPF) in 5G networks. Further, in an exemplary embodiment, a programmable network device 230 includes at least a port associated with a control signal reference point, such as the N4 reference point, which is used as an input for control signals. For example, as described herein, a management module in a programmable network device is configured to receive session information from a control gateway (SGW-C or PGW-C) or session management function (SMF), via the port associated with the N4 reference point. The control information received via the N4 reference point includes information related to provisioning a new session (e.g. using the packet forwarding control protocol (PFCP), quality of service information, billing information (including how and when to generate billing records), unique identifiers for a session, and so on. In an exemplary embodiment, information received via the N4 reference point enables the programmable network device to perform session life cycle management. In an exemplary embodiment, in 4G networks, the port is associated with a S1-U or S5/S8-U interface or reference point.

For the purposes of this disclosure, a "kernel" is a piece of code that gets started at a clock cycle and runs to completion however many clock cycles that takes. There is the ability to quickly send messages from one kernel to another, and then establish (logically) a pipeline of steps that gets executed. Different packets at different stages going through the pipeline. This stands in contrast to prior art systems, where the limitation is in a number of threads and physical number of cores associated with a host. Whereas in the disclosed embodiment, as many kernels as needed can concurrently be executed on an FPGA. While the server 203 can initiate a kernel on FPGA 205, the kernels are persistent, and continue processing packets traversing the programmable network device 230. Thus, an entire pipeline process is performed by a single device, without extraneous network communication. Even buffers for QoS enforcement (e.g. buffer 216) benefits networks by not having to transport data packets unnecessarily. This is enabled by large memory sizes of FPGA 205 (e.g. 8 GB or more).

Further in exemplary embodiments, a pipeline of a data packet (i.e. a single flow) can be broken down into several steps, with different packets in different steps of that pipeline processing. In other words, a pipeline process can be broken down and processed sequentially, with multiple sessions being performed in parallel. In one exemplary embodiment, a FPGA 205 comprises 4×100 gb ports, and 4 FPGAs can be provided within a single rack unit. This can provide a theoretical data throughput of 1.6 TB, enabling these programmable network devices to process data equivalent to today's major urban areas. In an exemplary embodiment, multiple instances of a host program may be executed on a single programmable network device, enabling multiple instances that provide parallel processing functions between different network ports.

Figure 3:
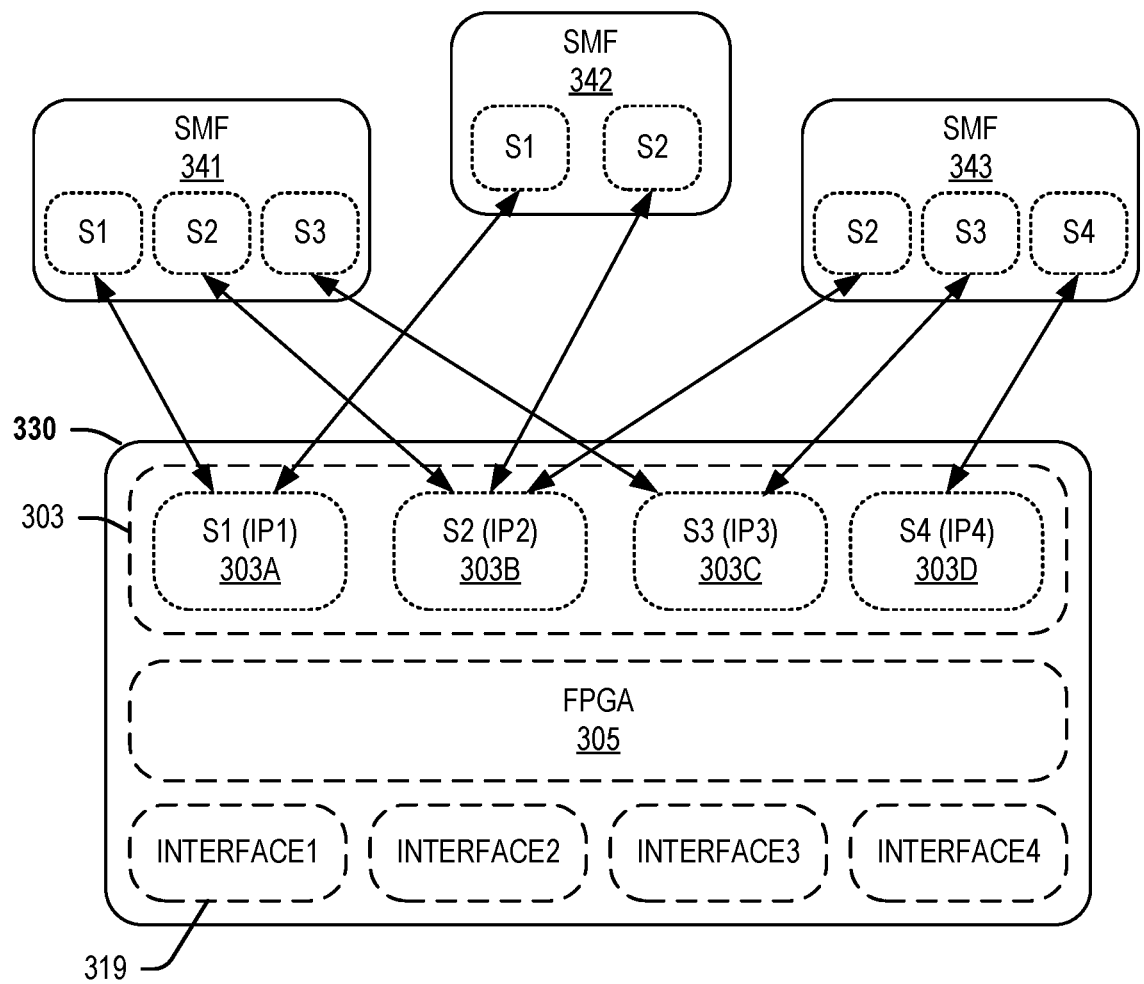
FIG. 3 depicts another exemplary programmable networking device configured to perform user plane functions.

FIG. 3 illustrates an exemplary programmable network device 330 that is configured with a plurality of virtual hosts (or host instances) 303A-303D communicatively coupled to a single FPGA 305. Plurality of host instances 303A-303D are configured on a single host server 303, similar to server 203 in FIG. 2. Not illustrated herein (for simplicity's sake) are additional components that will be understood as being included in host server 303 by those having ordinary skill in the art, such as a processor, memory, etc.

The programmable network device 330 can be used to perform network slicing, especially in 5G networks. For example, each virtual host instance 303A-303D can be configured to communicate with one or more SMFs 341-343 and transmit data sessions associated with different network slices. To each SMF 341-343 (and to any other external network node), host instances 303A-303D each appears to be a different or separate UPF node. This is enabled by configuring each host instance 303A-303D with a different network address, such as an IP address. Slice information is generally transmitted throughout a 5G radio access network and core, but typically not transmitted to UPF nodes. This is because, generally in the signaling to UPF (via n4) there is nothing related to network slicing. Thus, each UPF slice (S1, S2, S3, etc.) appears to be a separate UPF. Whereas, each different SMF maintains slice information related to sessions associated with each slice S1, S2, S3, etc.

This configuration is particularly effective for network slicing implementation purposes, especially with regards to rule enforcement. For example, a policy and charging (PCF) is used to establish predefined rules for a network slice. Meanwhile, FPGA 305 stores a configuration for each slice, including predefined rules associated therewith. When the PCF sends rule activation information to one or more SMFs 341-343, which then gets forwarded to programmable network device 330, a rule name is activated, rather than having to process all the details of the predefined rule dynamically. In other words, the dynamic association with slices is performed at the control plane (at SMFs 341-343, PCFs, etc.), while at the user plane (at programmable network device 330 and specifically at FPGA 305), only rules are activated without needing to be associated with slices. Thus, a single FPGA (e.g. FPGA 305) becomes a common resource for multiple network slices, which reduces the need for multiple interfaces 319 per slice, reducing waste and extra overhead.

As further described below with references to FIGS. 4-6, programmable network devices (such as programmable network device 230) can replace the myriad components of existing 4G CUPS gateways and 5G UPFs, and may similarly be positioned or located at various points within a network topology depending on a network operator's requirement. In an exemplary embodiment, a programmable network device as described herein can be co-located with an access node, such as a gNodeB or eNodeB, such that data flows may directly egress from the user plane at the radio access network (RAN) to the destination network. This eliminates having to transport the data packets to central sites or networks.

Figure 4:
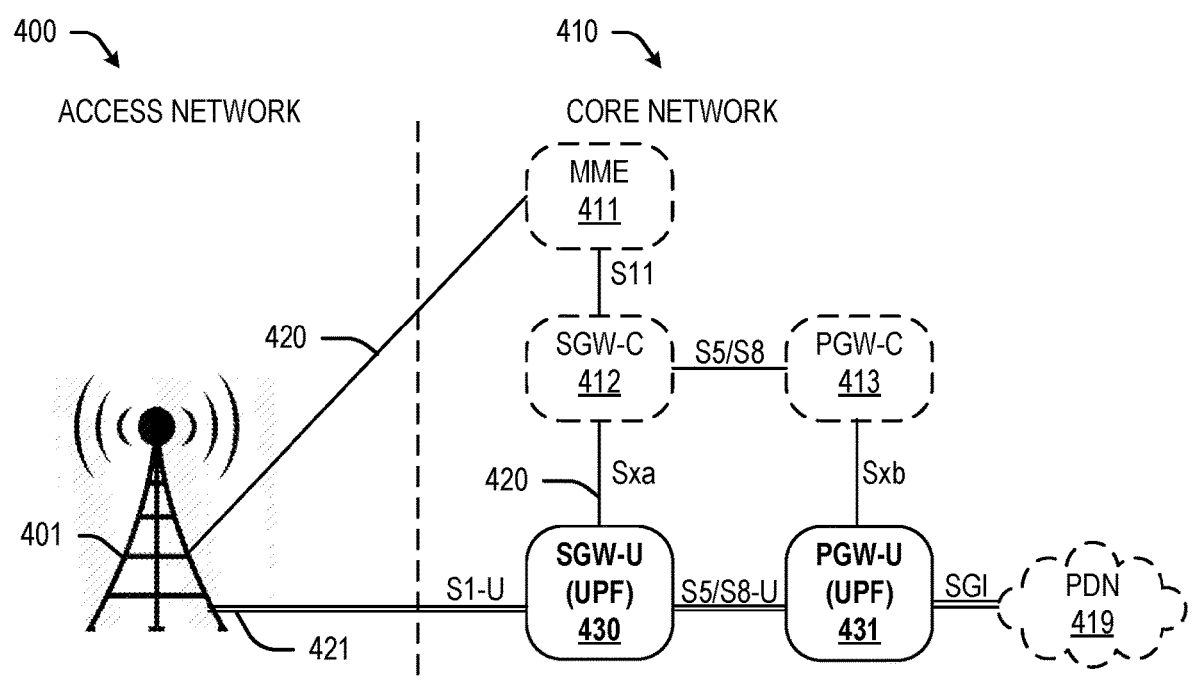
FIG. 4 depicts an exemplary programmable network device implemented in a 4G system.

FIG. 4 depicts components of an exemplary 4G LTE radio access network 400 and core network 410. Access node 401 can include an eNodeB, and may function similarly to access node 110 described in FIG. 1. Further, the programmable network devices 430 and 431 can be similar to the programmable network device 230. For example, programmable network devices 430/431 can include a processor, a memory, and a FPGA or equivalent device that is configured to perform the various user plane and pipeline processing functions described herein (i.e. UPF). Such a programmable network device may comprise multiple hardware circuits and software modules associated with the different types of functions, all of which are incorporated into a single hardware unit, such as a rack-mountable unit. Data packets associated with data sessions are routed through a "pipeline" comprising these circuits and modules, such that the different types of functions are configured to perform "pipeline processing" of the data packets in real time, and without the excessive signaling and transmission required by prior-art configurations of control and data gateways. Specifically, data packets traverse access network 400 and core network 410 via the user plane 421, while control signals are transmitted across access network 400 and core network 410 via the control plane 420.

Mobility management entity (MME) 411 can be a control node for 4G networks, as it is configured to manage network access and mobility for wireless devices attached to access node 401, as well as establish bearer paths the wireless devices. The MME 411 is also responsible for bearer activation/deactivation process. In addition, it is responsible for selecting the serving gateway (S-GW) for a wireless devices at the initial attach and at time of a handover. Further, the MME 411 can authenticate users and generate and allocate temporary identities to wireless devices. The MME 411 also controls mobility between LTE and 2G/3G access networks, and controls other network elements, by means of signaling messages that are internal to the core network 410.

In this exemplary embodiment, programmable network devices may be incorporated on the radio access network (RAN) 400 or the core network 410 in any combination. For example, programmable network devices 430, 431 are illustrated as replacing user plane gateways in the core network 410. Generally, the S-GW is divided into two entities, a SGW-U for processing data packets in the control plane, and a SGW-C for managing control signaling. This is one specific implementation of 4G CUPS. In some embodiments, the S-GW and P-GW may be combined into an SAE-GW, such that there are two gateways, an SAEGW-C for control-plane signaling and an SAEGW-U for user-plane data packet transmissions. Since it is beneficial to have the user plane co-located (or as close as network architecture allows) to the access node and/or the edge of the access network 400, and then directly egress from that user plane to the destination network (e.g. PDN 419), this configuration reduces or eliminates extraneous transport of data through the core network. These benefits may be further enhanced by providing a plurality of programmable network devices deployed close to access nodes, and fewer control plane elements (e.g. MME 411 and gateways 412, 413). Thus, incorporating the programmable network devices 430, 431 stands in contrast to prior-art gateways that comprise separate hardware devices and external host servers that may consume excessive network resources as described above. Whereas in the prior art, an external host server communicates with a switch and instructs the switch with regards to data management, in the disclosed embodiments, the data management functions described herein are programmed into the programmable network devices 430, 431, which eliminates the need for an external host server, as well minimizing excessive communication and signaling that is required to communicate between the prior-art switches and other gateways and servers. Thus, providing a programmable network devices 430, 431 with multiple different functions that interface with each other and perform pipeline processing within a single unit preserves network resources such as power, bandwidth, etc.

As further described herein, the programmable network devices 430, 431 are configured to transport data packets between wireless devices attached to access node 401 and PDN 419 with source and destinations nodes including but not limited to application servers, session management, proxy, web server, media server, or end-user wireless devices coupled to another wireless network or RAN. Therefore, the programmable network devices 430, 431 can include one or more ports that are associated with different reference points. For example, each programmable network device 430, 431 can include a first set of ports associated with reference points for data transmission between different network nodes, and a second set of ports associated with reference points for control signal transmission between different network nodes. For example, each programmable network device 430, 431 includes at least a port associated with S1-U or S5U reference points, which are used as a data input or output between the programmable network device and access node 401, PDN 419, between other programmable network devices, etc. Further, each programmable network device 430, 431 includes at least a port associated with a control signal reference point, which is used as an input for control signals via control plane 420. For example, as described herein, a server in a programmable network device is configured as a host module to receive session information from SGW-C 412 or PGW-C 413, via said port associated with the control transmissions reference point.

Figure 5:
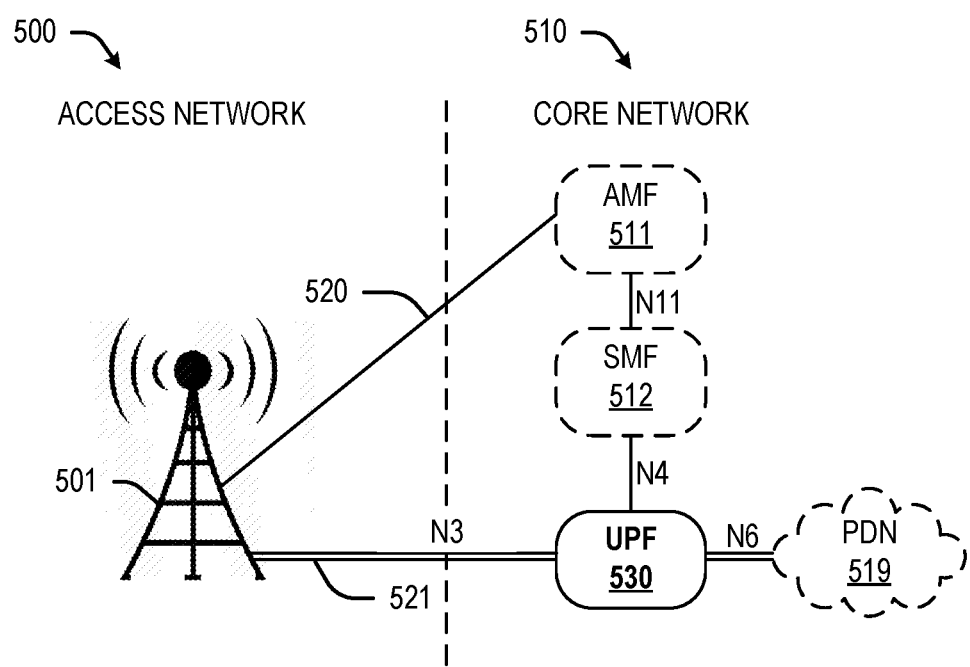
FIG. 5 depicts an exemplary programmable network device implemented in a 5G system.

FIG. 5 depicts exemplary programmable network device 530 implemented in a 5G system. The components of exemplary 5G access network 500 include at least an access node 501, which can include a gNodeB, and may function similarly to access node 110 described in FIG. 1. Further, the programmable network devices 530 and 515 can be similar to the programmable network device 230. For example, programmable network devices 530, 515 can include a processor, a memory, and a FPGA or equivalent device that is configured to perform the various user plane and pipeline processing functions described herein (i.e. UPF). Such a programmable network device may comprise multiple hardware circuits and software modules associated with the different types of functions, all of which are incorporated into a single hardware unit, such as a rack-mountable unit. Data packets associated with data sessions are routed through a "pipeline" comprising these circuits and modules, such that the different types of functions are configured to perform "pipeline processing" of the data packets in real time, and without the excessive signaling and transmission required by prior-art configurations of control and data gateways.

Specifically, data packets traverse access network 500 and core network 510 via the user plane 521, while control signals are transmitted across access network 500 and core network 510 via the control plane 520. In an exemplary embodiment, access and mobility function (AMF) 511 and session management function (SMF) 512 function similarly to MME 411 described in FIG. 4. For example, the AMF 511 can receive connection requests from one or more wireless devices via access node 501, and manages anything to do with connection or mobility management, while forwarding session management requirements over an N11 interface to the SMF 512. Meanwhile, the SMF 512 is primarily responsible for interacting with the decoupled data plane 521, creating updating and removing Protocol Data Unit (PDU) sessions and managing session context with a User Plane Function (UPF), which in this embodiment, is replaced with a programmable network device 530. Generally, the UPF represents the data plane evolution of a 4G CUPS system described in FIG. 4, which decouples PGW control and user plane functions, enabling the data forwarding component (PGW-U) to be decentralized. This allows packet processing and traffic aggregation to be performed closer to the network edge, increasing bandwidth efficiencies while reducing network. The PGW's handling signaling traffic (PGW-C) remain in the core, northbound of the Mobility Management Entity (MME). The UPF functions similarly, by providing an interconnect point between the mobile infrastructure and the packet data network (PDN) 519, encapsulation and decapsulation of GPRS Tunnelling Protocol for the user plane (GTP-U), acting as a PDU session anchor point for providing mobility within and between Radio Access Technologies (RATs), including sending one or more end marker packets to the gNodeB 501, and packet routing and forwarding functions.

Meanwhile, as described herein, traditional UPFs practically include a plurality of different servers and switches, thereby adding signaling complexity to existing networks. These various components also utilize excessive resources, since they usually comprise general purpose servers running a standard operating system that is configured to implement the interfaces between the control plane 520 and the UPF, and would need to provision the management functions of the data down to the hardware switches responsible for transporting data across the user plane 521, thereby creating a bottleneck in communication. Thus, incorporating the programmable network device 530, configured to perform the various data session management functions performed by prior-art UPFs, eliminates the need for an external host server, as well minimizing excessive communication and signaling that is required to communicate between the prior-art switches and other gateways and servers. Further, providing a programmable network device 530 with multiple different functions that interface with each other and perform pipeline processing within a single unit preserves network resources such as power, bandwidth, etc.

Further, the programmable network device 530 can include one or more ports that are associated with different reference points. For example, programmable network device 530 can include a first set of ports associated with reference points for data transmission between different network nodes, and a second set of ports associated with reference points for control signal transmission between different network nodes. This can include at least a port associated with the N3 reference point, which is used as a data input or output between the programmable network device 530 and access node 501. Further, programmable network switch 530 includes at least a port associated with the N6 reference point, which is used as a data input or output between the programmable network switch and PDN 519. Further, the programmable network switch 530 includes at least a port associated with the N9 reference point, which is used as a data input or output between other programmable network switches not shown herein. Further, the programmable network switch 530 includes at least a port associated with a control signal reference point, such as the N4 reference point, which is used as an input for control signals via control plane 520. For example, as described herein, a server or host module in programmable network switch 530 is configured to receive session information from SMF 512, via the port associated with the N4 reference point. The control information received via the N4 reference point includes information related to provisioning a new session (e.g. using the packet forwarding control protocol (PFCP), quality of service information, billing information (including how and when to generate billing records), unique identifiers for a session, and so on.

Further, several programmable network devices can be arranged such that data packets originating from various RANs can traverse minimal other networks or nodes to reach their destination. Incorporating data management functions into these programmable network devices also minimizes the need for extra control plane elements and communication therebetween. Since it is beneficial to have the user plane co-located (or as close as network architecture allows) to the access node, and then directly egress from that user plane to the destination network (e.g. PDN 519), this configuration reduces or eliminates extraneous transport of data through the core network. These benefits may be further enhanced by providing a plurality of programmable network devices deployed close to access nodes, and fewer control plane elements (e.g. AMF 511 and SMF 512).

Figure 6:
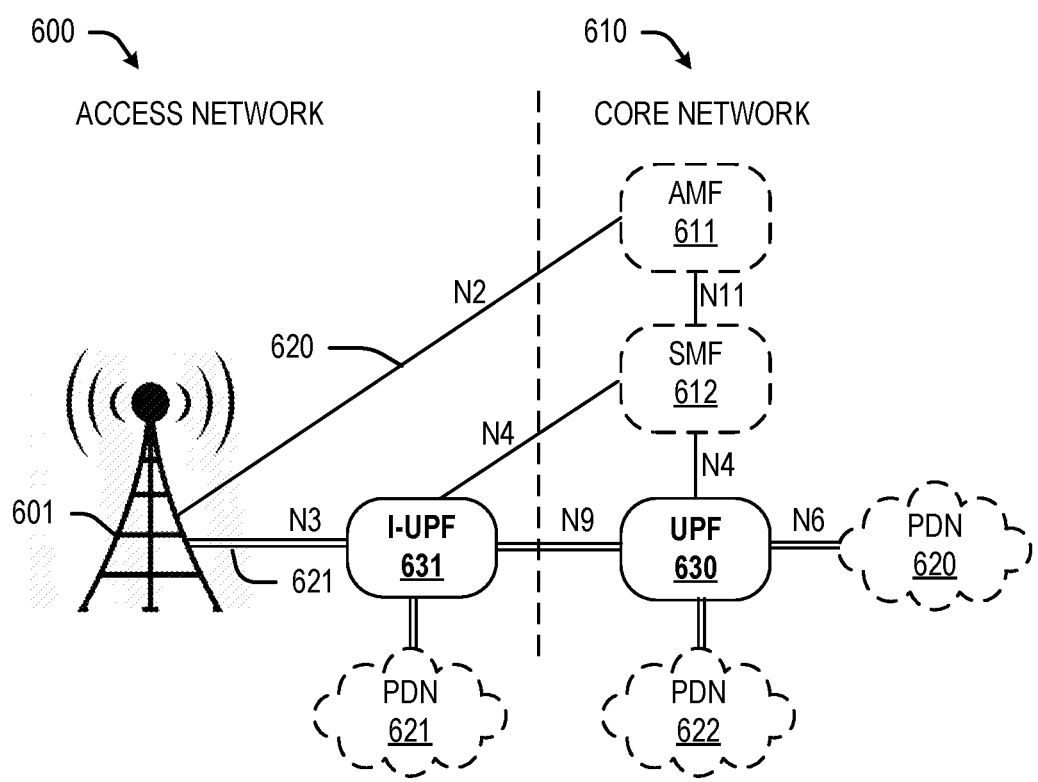
FIG. 6 depicts a plurality of exemplary programmable network devices implemented in another 5G system.

For example, FIG. 6 illustrates a plurality of exemplary programmable network devices provided in a 5G network. Similar to FIG. 5, the components of exemplary 5G access network 600 include at least an access node 601, which can include a gNodeB, and may function similarly to access node 110 described in FIG. 1. Further, access network 600 includes an additional programmable network device 631. Other components not shown herein, such as cell site routers, gateways, switches, controllers, etc. may be envisioned by those having ordinary skill in the art in light of this disclosure. In this embodiment, the programmable network devices 631, 630 can be similar to the programmable network device 230. Further, programmable network device 631 enables direct user-plane access to any other network node, PDN or SMF 612 directly from the access network 600, with the control signaling being provided by SMF 612. Certain specialized applications that need to have connectivity close to the access network 600 benefit from this implementation, since the user plane 621 need not be traversed all the way into the core network 610. Certain application servers may be accessible such that services corresponding to these application servers can be accessed directly, in contrast with other network nodes that may only be accessible via combination of PDN 620 and programmable network device 630. This is beneficial for edge-deployment of network services, versus other network nodes that are only accessible via PDN 620.

Further, the programmable network devices 631, 630 can include one or more ports that are associated with different reference points. For example, each programmable network device 631, 630 can include a first set of ports associated with reference points for data transmission between different network nodes, and a second set of ports associated with reference points for control signal transmission between different network nodes. This can include at least a port associated with the N3 reference point, which is used as a data input or output between the programmable network device and access node 601. Further, each programmable network device 631, 630 includes at least a port associated with the N6 reference point, which is used as a data input or output between the programmable network device and a PDN. Further, each programmable network device 631, 630 includes at least a port associated with the N9 reference point, which is used as a data input or output between other programmable network devices not shown herein. Further, each programmable network device 631, 630 includes at least a port associated with a control signal reference point, such as the N4 reference point, which is used as an input for control signals via control plane 620. For example, as described herein, a host module in each programmable network device 631, 630 is configured to receive session information from SMF 612, via the port associated with the N4 reference point. The control information received via the N4 reference point includes information related to provisioning a new session (e.g. using the packet forwarding control protocol (PFCP), quality of service information, billing information (including how and when to generate billing records), unique identifiers for a session, and so on.

Figure 7:
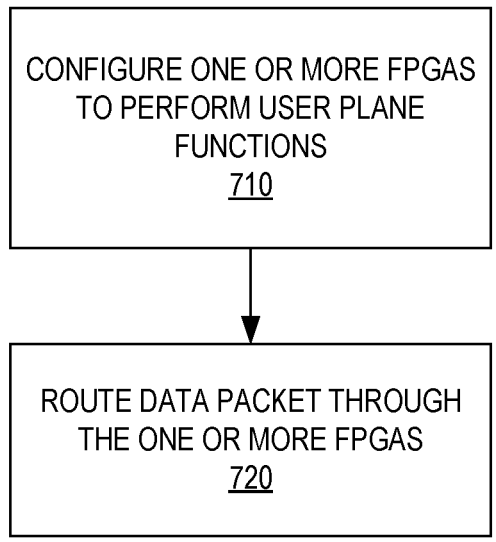
FIG. 7 depicts exemplary operations performed by a programmable network device.

FIG. 7 depicts exemplary operations performed by a programmable network device. For example, the operations of FIG. 7 may be performed by one or more FPGAs coupled to a networking device similar to device 230 or 300. Although FIG. 7 depicts steps performed in a particular order for purposes of illustration and discussion, the operations discussed herein are not limited to any particular order or arrangement. One skilled in the art, using the disclosures provided herein, will appreciate that various steps of the methods can be omitted, rearranged, combined, and/or adapted in various ways.

At 710, the one or more FPGAs are configured to perform user plane functions. For example, a host module on a memory coupled to a processor can interface between an FPGA programmed with UPF functionality and a control plane network node or gateway. The user plane functions performed by such a device can include applying quality of service (QoS) policies to data packets traversing the user plane, managing data sessions associated with different rules such as guaranteed bit rate (GBR) and maximum bit rate (MBR) and token buckets associated therewith, pipeline processing, synchronizing transmission of data packets and control signals with timers at various operational layers, and so on.

Thus, at 720, data packets associated with data sessions are routed through the FPGA, and the user plane functions performed thereon. In an exemplary embodiment, a single instance of a UPF application (e.g. host application) will interoperate with (or manage) a single FPGA card with multiple network interfaces. Therefore, data session packets can be routed one or more network interfaces on a single FPGA card. Incorporation of such programmable network devices can enhance or replace the myriad existing packet gateways, such as a CUPS based user plane S-GW, P-GW, or SAE-GW in 4G networks, and user plane functions (UPF) in 5G networks. This eliminates the need for an external host server, as well minimizing excessive communication and signaling that is required to communicate between the separate prior-art switches and external host servers.

Additional functions performed by exemplary programmable network devices disclosed herein can include communicating with other network components, such as a controller node, managing health of different network nodes such as eNodeBs, gNodeBs, other components of a UPF, or any network node along the data path, as well as tunnel identification management, session identifier management, and so on. In exemplary embodiments, the programmable network device receives control-plane instructions from a session management function (SMF) in the case of 5G, and the SGW-C and PGW-C in the case of 4G. Based on the instructions from the controller node, a host module of the programmable network device can determine how to process the data sessions associated with the data packets it receives. The host module interacts with an embedded circuit such as an FPGA that is programmed to transmit and receive session data, routing tables, and pipeline processing including updating packet headers, applying quality of service (QoS) policies, and forwarding/transporting the data packets associated with the data sessions, based on the information received from the host module.)

Figure 8:
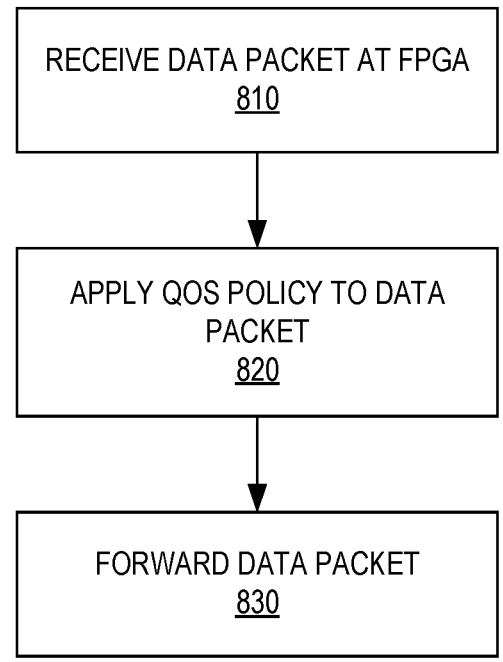
FIG. 8 depicts exemplary operations performed by a programmable network device.

FIG. 8 depicts exemplary operations performed by a programmable network device. For example, the operations of FIG. 8 may be performed by one or more FPGAs coupled to a networking device similar to device 230 or 300. Although FIG. 8 depicts steps performed in a particular order for purposes of illustration and discussion, the operations discussed herein are not limited to any particular order or arrangement. One skilled in the art, using the disclosures provided herein, will appreciate that various steps of the methods can be omitted, rearranged, combined, and/or adapted in various ways.

At 810, a data packet is received at one or more FPGAs configured to perform user plane functions. For example, a host module on a memory coupled to a processor can interface between an FPGA programmed with UPF functionality and a control plane network node or gateway. The user plane functions performed by such a device can include applying quality of service (QoS) policies to data packets traversing the user plane, managing data sessions associated with different rules such as guaranteed bit rate (GBR) and maximum bit rate (MBR) and token buckets associated therewith, pipeline processing, synchronizing transmission of data packets and control signals with timers at various operational layers, and so on.

Thus, at 820, a QoS policy is applied to the data packet. For example, a packet analysis kernel is configured to receive data packets and forward the data packets to as QoS kernel, which in turn performs token-based application of QERs and PDRs to the data packet, using for example GBR and MBR rules associated with the data packets or data streams, as further described herein. At 830, the data packet is forwarded by, for example, a packet transformation kernel that is configured to modify headers and forward data packets to other network nodes.

Figure 9:
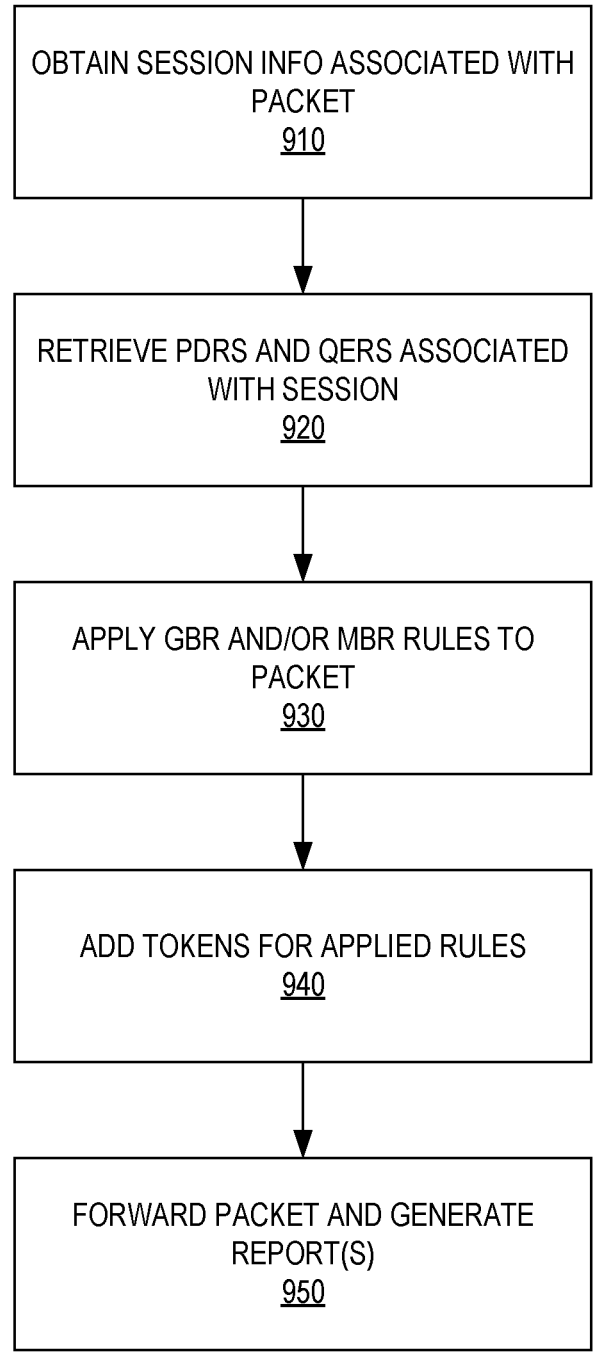
FIG. 9 depicts exemplary QoS operations performed by a programmable network device.

FIG. 9 depicts exemplary QoS operations performed by a programmable network device. For example, the operations of FIG. 9 may be performed by one or more FPGAs coupled to a networking device similar to device 230 or 300. Although FIG. 9 depicts steps performed in a particular order for purposes of illustration and discussion, the operations discussed herein are not limited to any particular order or arrangement. One skilled in the art, using the disclosures provided herein, will appreciate that various steps of the methods can be omitted, rearranged, combined, and/or adapted in various ways.

At 910, session information associated with an incoming data packet is retrieved. In an exemplary embodiment, a QoS kernel receives session and bearer information (e.g. session ID) from a packet analysis kernel and/or lookup tables stored on the one or more FPGAs. This information may be previously or periodically provisioned into the FPGAs from a control plane via a host module, or other means evident to those having ordinary skill in the art in light of this disclosure. At 920, based on the session information, relevant QERs and PDRs can be retrieved. In an exemplary embodiment, a PDR is obtained for a session associated with a data packet, and QERs (such as MBR and GBR rules, as well as other rules like forwarding action rule, usage reporting rules, etc.) are determined based on the PDR.

At 930, the QoS kernel uses tokens to apply the GBR and MBR rules to the data packet. The MBR/GBR policies are applied based on tokens in different buckets associated with different packet detection rules and/or QoS enforcement rules (QER). This step can include instructing a packet transformation kernel to modify headers of data packets according to the application of the rules. Further, at 940, tokens are added for the applied rules. In an exemplary embodiment, tokens are added to buckets upon application of a rule (QER/PDR) rather than at periodic intervals or by any other default mechanism. Unlike the prior art wherein token buckets are refilled based on timers, the disclosed embodiment enables handling the high volume of data sessions (and multiple buckets and/or rules associated therewith) without causing delays or overwhelming networks. Multiple QERs may be applied to each single packet, and runtime data associated with the QER (e.g. usage tokens, etc.) can be processed only when a particular QoS rule is applied or enforced.

At 950, as/when rules are applied, tokens are forwarded to a packet transformation kernel, which performs packet header rewriting, enabling the packet to be forwarded to an appropriate destination. Packets can be buffered in a buffer for example as a first in first out (FIFO) linked list associated with a particular PDR. Further, packets can be forwarded from the FPGA based on a combination of factors including tokens in the bucket, timer ticks, packet size, other contents of the buffer, and so on. For example, multiple packets associated with different PDRs may exceed an average maximum bit rate (AMBR) rule, which results in a session QER being exceeded, which in turn affects every additional packet in the buffer. Further in an exemplary embodiment, packets are forwarded based on a precedence value of one or more PDRs associated with the data packet (or data session). For example, while data packets associated with a specific PDR are transmitted based on FIFO, data packets associated with different PDRs can use a precedence value. Further, one or more time windows (determined by a tick timer kernel) during which tokens are incremented in individual buckets, enabling rules and reports to be generated and transmitted to a host module and/or other network entities in a synchronized manner without excessive resource usage. Thus, transmission of packets may be synchronized at a future time.

Figure 10:
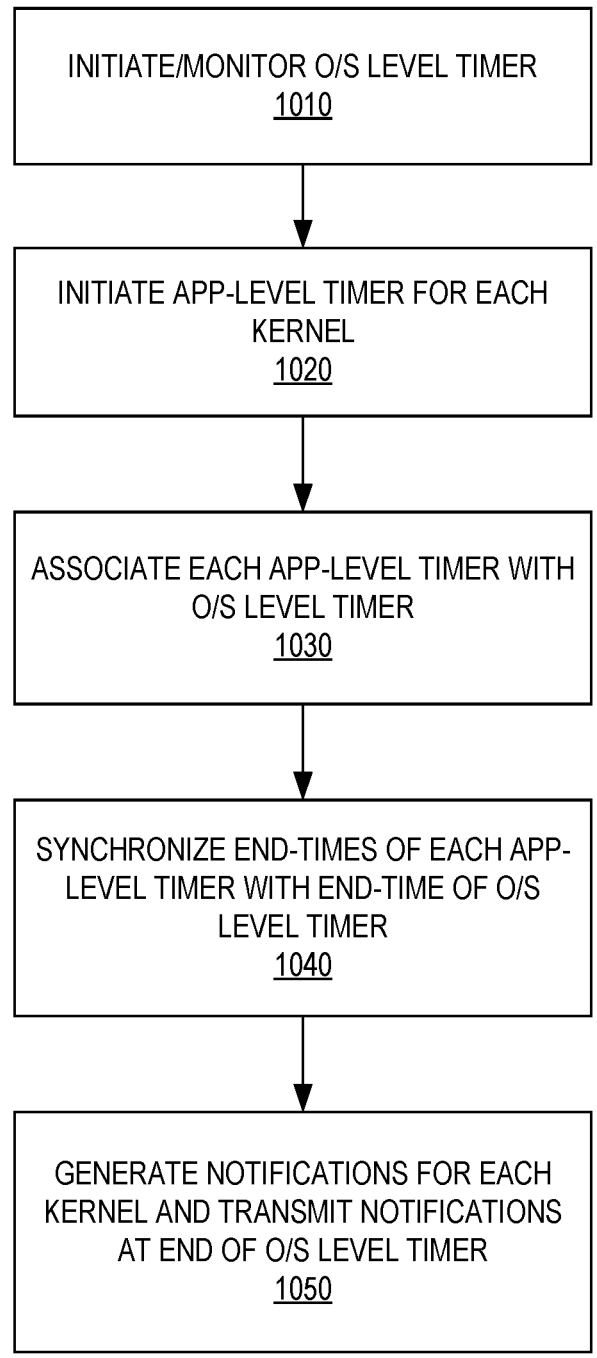
FIG. 10 depicts exemplary timer synchronization operations performed by a programmable network device.

FIG. 10 depicts exemplary timer synchronization operations performed by a programmable network device. For example, the operations of FIG. 10 may be performed by one or more FPGAs coupled to a networking device similar to device 230 or 330. Although FIG. 10 depicts steps performed in a particular order for purposes of illustration and discussion, the operations discussed herein are not limited to any particular order or arrangement. One skilled in the art, using the disclosures provided herein, will appreciate that various steps of the methods can be omitted, rearranged, combined, and/or adapted in various ways.

At 1010, an operating system (O/S) layer timer is initiated. The O/S layer timer may corresponding to a host module timer, or a timer external to the one or more FPGAs. Further, kernels on the FPGA can be configured to utilize timer pooling via application-layer timers. Thus at 1020, an application-layer timer is initiated when a kernel is executed. During pipeline processing, various kernels are executed to perform operations on different data packets within a data session. Therefore, different application-layer timers may be started at different times.

To synchronize the timers, at 1030 and 1040, the multiple application-layer timers are associated with a single O/S layer timer, and the end-times of each application-layer timer is synchronized with the end time of the single O/S layer timer. In other words, an end of a kernel-layer clock cycle (e.g. as measured by a tick timer kernel) is synchronized with an operation-system-layer clock cycle (e.g. as measured by the host module). Thus, each user plane function is synchronized with an end-time of a host-layer clock cycle, and each user plane function is executed for the duration of one or more host-layer clock cycles. Further the host module may be configured to deploy a timer associated with each usage process, and upon expiration thereof, generate a time-based usage report or notification 1050 to the control plane (e.g. SMF or other control gateway communicatively coupled thereto). Therefore, one host-layer timer object per expiration time is provided regardless of when the timer started, enabling multiple logical (i.e. kernel-layer) timer elements associated with the single expiration time. This also enables a single notification to be generated at the single expiration time at 1050. Due to packet processing a large number of packets within a session, millions of timers may be running at the kernel layer, and are pegged to one higher-layer timer object per expiration time. The expiration times can also be normalized, e.g. arranged in 50 ms increments, such that a timer is started as being associated with a specific expiration time, and the event notification for the timer is created upon that specific expiration time being met. Kernel-layer timers that are canceled can be removed or disassociated itself from the specific expiration time. This minimizes a total number of timers and number of usage reports for the packet processing pipeline.

Various embodiments have been disclosed for utilizing a programmable network device, such as a FPGA, for user plane function, whereby user data packets are processed within a single device without having to be transmitted to and from other network nodes for processing. Exemplary programmable network devices are programmed using a high-level programming language, such as C++, and can utilize commercially available hardware in novel configurations as described herein, such as a small-footprint (1 rack unit) server with up to 1.6 Tb raw throughput. Thus, a single UPF device is interoperable with multiple SMFs provided by different network operators or vendors, via for example the N4 interface as needed. Such programmable network devices can deliver QoS support (e.g. MBR enforcement, GBR compliance, downlink DSCP marking, etc.), as well as UPF network slicing by configuring logically separate UPF's for the N4 interface on a single server, while utilizing an FPGA as a common resource across the slices. Each network slice can be configured to support predefined rules for quality of service enforcement (QER), forwarding action (FAR), usage reporting (URR), etc., and can further focus on separate processing of IP multimedia system (IMS) versus regular internet user traffic.

In light of this disclosure, it will be evident to those having ordinary skill in the art that any specialized circuits including FPGAs, ASICs, and other types of processors, can be configured to perform the pipeline processing, auxiliary processing (i.e. pre and post processing), and data management operations, so long as they are in direct communication with each other and incorporated within a small 1-2 unit network node, thereby mitigating the need for extraneous communication across different network nodes in different geographical regions. Further, the exemplary embodiments described herein can be performed under the control of a processing system executing computer-readable codes embodied on a computer-readable recording medium or communication signals transmitted through a transitory medium. The computer-readable recording medium is any data storage device that can store data readable by a processing system, and includes both volatile and nonvolatile media, removable and non-removable media, and contemplates media readable by a database, a computer, and various other network devices.

Examples of the computer-readable recording medium include, but are not limited to, read-only memory (ROM), random-access memory (RAM), erasable electrically programmable ROM (EEPROM), flash memory or other memory technology, holographic media or other optical disc storage, magnetic storage including magnetic tape and magnetic disk, and solid state storage devices. The computer-readable recording medium can also be distributed over network-coupled computer systems so that the computer-readable code is stored and executed in a distributed fashion. The communication signals transmitted through a transitory medium may include, for example, modulated signals transmitted through wired or wireless transmission paths.

The above description and associated figures teach the best mode of the invention. The following claims specify the scope of the invention. Note that some aspects of the best mode may not fall within the scope of the invention as specified by the claims. Those skilled in the art will appreciate that the features described above can be combined in various ways to form multiple variations of the invention. As a result, the invention is not limited to the specific embodiments described above, but only by the following claims and their equivalents.

The invention claimed is:

1. A method, comprising:
coupling a field-programmable gate array (FPGA) to a server managing data sessions and life cycles associated with data packets processed by the FPGA, the server interfacing with control plane functions, both the server and the FPGA incorporated in a programmable network device;
configuring the FPGA to perform a plurality of user plane functions, the plurality of user plane functions comprising at least applying a quality of service (QoS) policy to the data sessions routed through the FPGA;
routing data packets associated with the data sessions through the FPGA;
applying the QoS policy to the data packets by associating tokens with a QoS enforcement rule (QER); and
adding new tokens upon application of the QoS policy.

2. The method of claim 1, further comprising receiving the data packets at the FPGA; retrieving session information associated with the data sessions; and applying the QoS policy to the data packets based on the session information.

3. The method of claim 1, wherein applying the QoS policy comprises associating tokens with multiple QoS enforcement rules (QERs).

4. The method of claim 3, wherein the one or more QERs are associated with one or both of a guaranteed bit rate (GBR) or a maximum bit rate (MBR).

5. The method of claim 3, further comprising adding tokens associated with a QER when a data packet associated with the QER is received.

6. The method of claim 5, further comprising tracking when tokens are added based on one or more clock cycles.

7. The method of claim 1, further comprising executing each user plane function for a duration of the one or more clock cycles.

8. The method of claim 7, wherein the one or more clock cycles comprise application-layer clock cycles.

9. The method of claim 8, further comprising synchronizing an end of the application-layer clock cycles with a host-layer clock cycle.

10. The method of claim 1, further comprising deploying a plurality of host instances in a single server, the plurality of host instances configured to communicate with the FPGA.

11. The method of claim 10, wherein each host instance is configured to process data in a network slice.

12. The method of claim 1, wherein the FPGA is programmed using a high-level programming language.

13. A field-programmable gate array (FPGA), comprising:
a processor;
a memory coupled to the processor, the memory being programmed with instructions that are executed by the processor to perform operations comprising:
receiving a data packet at the FPGA;
applying a quality of service (QoS) policy to the data packet by associating tokens with a QoS enforcement rule (QER);
adding tokens upon application of the QoS policy; and
forwarding the data packet based on the QoS policy; and
an interface coupling the FPGA to a server managing data sessions and life cycles associated with the data packets processed by the FPGA, the server interfacing with control plane functions, both the server and the FPGA incorporated in a programmable network device.

14. The FPGA of claim 13, wherein the operations further comprise retrieving session information associated with the data packet; and applying the QoS policy to the data packet based on the session information.

15. The FPGA of claim 14, wherein applying the QoS policy comprises associating tokens with multiple QoS enforcement rules (QERs).

16. The FPGA of claim 15, wherein the one or more QERs are associated with one or both of a guaranteed bit rate (GBR) or a maximum bit rate (MBR).

17. The FPGA of claim 15, wherein the operations further comprise adding tokens associated with a QER when a data packet associated with the QER is received.

18. The FPGA of claim 13, further comprising executing each user plane function for a duration of a first one or more clock cycles.

19. The FPGA of claim 18, further comprising synchronizing an end of the first one or more clock cycles with an operation-system-layer clock cycle.

20. The FPGA of claim 13, further comprising one or more network interfaces enabling coupling to additional network nodes.

* * * * *